United States Patent
Genise

(10) Patent No.: US 6,223,592 B1
(45) Date of Patent: May 1, 2001

(54) INDEPENDENT CONTROL OF TRANSMISSION-SIDE AND ENGINE-SIDE RETARDING DEVICES DURING RATIO CHANGES

(75) Inventor: Thomas A. Genise, Dearborn, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/191,683

(22) Filed: Nov. 13, 1998

(51) Int. Cl.[7] .................................................. F16H 59/00
(52) U.S. Cl. .............................................. 73/118.1; 701/51
(58) Field of Search .......................... 73/116, 117, 117.2, 73/117.3, 118.1; 701/29, 31, 51, 55, 56, 57, 58, 62, 64, 65, 66

(56) References Cited

U.S. PATENT DOCUMENTS

| 5,409,432 | * | 4/1995 | Steeby | 477/71 |
| 5,655,407 | * | 8/1997 | Dresden et al. | 74/336 R |
| 5,662,551 | * | 9/1997 | Kamada | 477/152 |
| 5,842,376 | * | 12/1998 | Dresden et al. | 74/336 R |
| 5,873,281 | * | 2/1999 | Stasik et al. | 74/335 |
| 5,910,069 | * | 6/1999 | Markyvech | 477/109 |
| 6,017,291 | * | 1/2000 | Ailes et al. | 477/124 |
| 6,095,002 | * | 8/2000 | Tuson et al. | 74/335 |

* cited by examiner

Primary Examiner—George Dombroske
(74) Attorney, Agent, or Firm—Brooks & Kushman P.C.

(57) ABSTRACT

A system and method for decreasing the time required to complete a ratio change in an electronically enhanced powertrain system include independently controlling at least one engine-side retarding device and at least one transmission-side retarding device. The retarding devices are selectively actuated to increase the decay rate of the engine speed and/or transmission input shaft speed during an upshift. Engine-side retarding devices may include an engine brake or operation of various engine accessories to increase engine loading. Transmission-side retarding devices may include input shaft brake or driveline retarder.

19 Claims, 3 Drawing Sheets

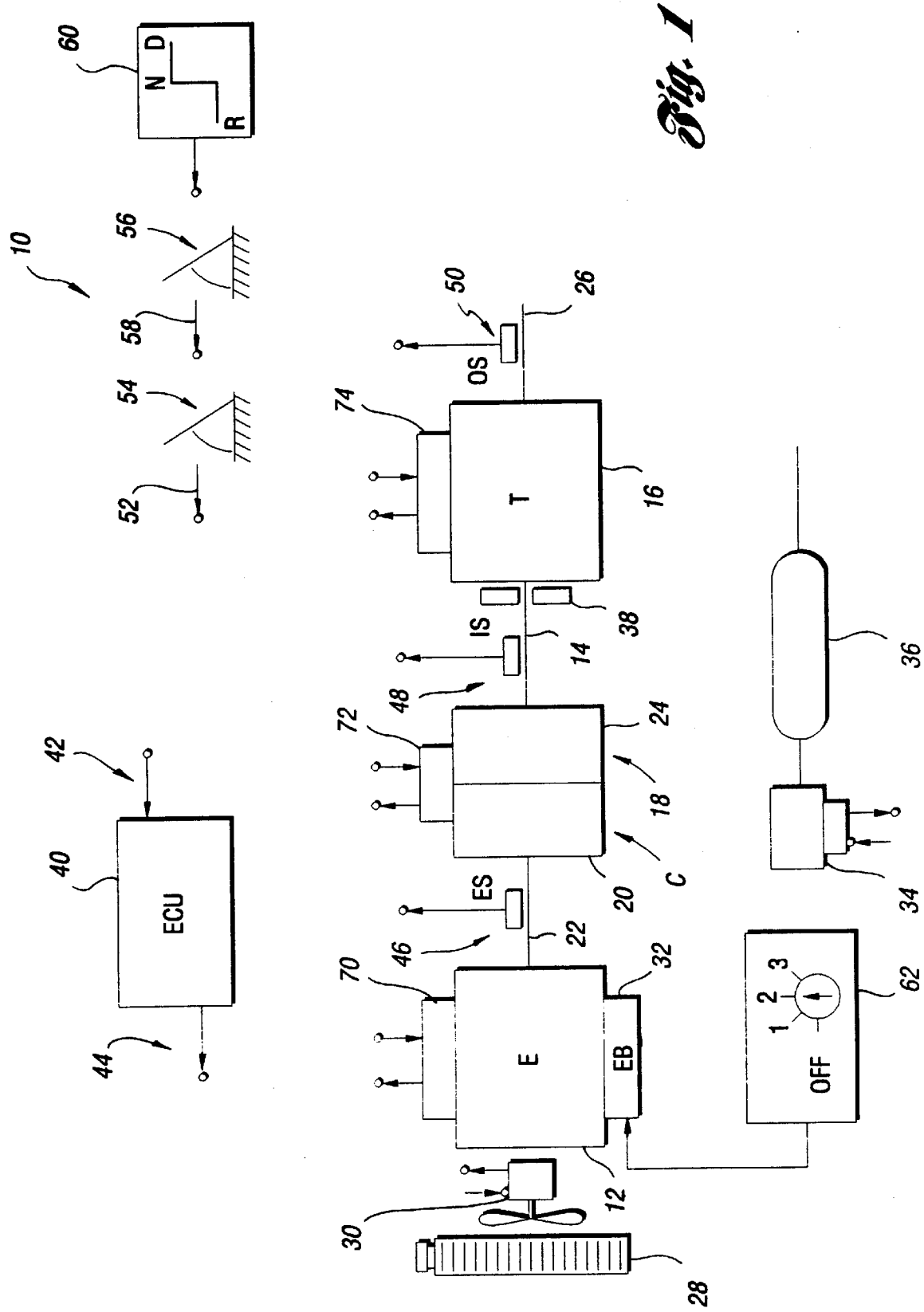

INDEPENDENT CONTROL OF TRANSMISSION-SIDE AND ENGINE-SIDE RETARDING DEVICES DURING RATIO CHANGES

TECHNICAL FIELD

The present invention relates to a system and method for decreasing the time required to complete a ratio change in an electronically enhanced engine and transmission system having an automatic clutch actuator.

BACKGROUND ART

Electronically enhanced transmission systems have been well developed in the prior art as may be seen by reference to U.S. Pat. Nos. 4,361,060; 4,595,986; 4,648,290; 4,722,248; and 5,050,427, the specifications of which are hereby incorporated by reference in their entirety. Transmission systems such as these have been utilized to provide a variety of gear ratios to enhance the flexibility and torque multiplication of an engine to service a plethora of applications. The most common applications include MVMA Class 7 and Class 8 tractor semi-trailer vehicles although other applications, such as automobile or stationary power plant powertrains, may also be serviced.

An electronic control module which includes a microprocessor is often used to control the powertrain, which includes an engine as well as a multiple gear ratio transmission. The continuous evolution of microprocessor technology has enabled increased accuracy and expanded the scope of control over engine and transmission operations. The electronic control module collects data from various sensors and issues commands appropriate for the current operating conditions to control the engine and transmission. Engine control may include modulating fuel, operating engine accessories, or managing application of an engine retarder, driveline retarder, or both. Transmission control may include selection of an appropriate gear ratio, including disengagement of the current gear ratio and engagement of a new target gear ratio, or operation of an input shaft brake.

Efficient ratio changing improves fuel economy and enhances drivability of a vehicle. Under certain demanding situations, such as when negotiating a steep grade with a heavily loaded vehicle, swift ratio changes are required to prevent the vehicle from losing momentum and missing entirely the window of opportunity to complete the shift. Under normal driving conditions, an operator may have to shift gears more than fifteen times before reaching highway speeds. In these applications, inefficiency in ratio changing may accumulate to a significant amount of wasted time. Thus, it is desirable to reduce the time necessary to complete a ratio change or shift.

A typical ratio change involves a number of steps. First, the operator must interrupt the transfer of torque from the engine through the transmission to the driveline. This may be accomplished by disengaging a master clutch which provides a frictional coupling between the engine and the transmission. The master clutch may be controlled by a modulating actuator in response to an appropriate command signal initiated by the operator, the electronic control module, or both in cooperation. Likewise, a simple (discrete or "dumb") actuator having only engaged and disengaged states may be used. Alternatively, a "throttle dip" may be performed where the throttle is abruptly decreased. Once the torque transfer has been interrupted, the current gear is disengaged and the transmission is in a neutral state.

The next step in a typical ratio change involves selecting the target gear ratio. This may be the next available gear ratio in a sequence, or a number of available ratios may be skipped, depending on the current operating conditions. Before engaging the target gear, the transmission input shaft should rotate at a substantially synchronous speed for the current output shaft speed and target gear ratio. When the master clutch is engaged, the input shaft speed may be manipulated by controlling engine speed since the engine and transmission are coupled. Engine speed may be increased (for a downshift) or decreased (for an upshift) to realize synchronous speed. On transmissions equipped with an input shaft brake, the input shaft speed may be reduced by disengaging the master clutch and applying the input shaft brake (also known as an inertia brake or clutch brake). However, input shaft brakes with sufficient capacity to decrease ratio changing time add cost and complexity to the transmission system and require accurate sequencing of events for satisfactory operation, so many transmissions only utilize simple versions of these devices.

For transmissions without input shaft brakes, synchronous speed will not be attained on an upshift until the engine speed naturally decays to synchronous. As engines and transmissions become more and more efficient, the reduction of internal frictional losses results in substantially lower natural decay rates. This results in a correspondingly longer time to complete a ratio change. Thus, it is desirable to increase engine and/or transmission input shaft deceleration during an upshift to achieve synchronous speed shortly after disengagement of the current gear.

When the master clutch is disengaged for a ratio change, engine speed and input shaft speed will likely decay at different rates based on their respective inertias. Thus, it is desirable to cooperatively control the decay rates of the engine speed and the input shaft speed to reduce the ratio changing time based on current operating conditions. This may be accomplished by retarding engine rotation, transmission input shaft rotation, or both. Likewise, any device or component coupled to the input shaft or engine during the ratio change may be retarded to improve the ratio changing time. Likewise a power synchronizer may be utilized to increase input shaft speed in conjunction with increased fueling to increase engine speed to decrease ratio changing times for a downshift.

One device often utilized to provide a variable retarding force to an engine, is an engine brake. The most common engine brakes may be either engine compression brakes or exhaust brakes. These devices are well known in the prior art and are commonly provided on heavy-duty vehicles. Examples of vehicular automated mechanical transmission systems utilizing engine brakes may be seen by reference to U.S. Pat. Nos. 4,933,850 and 5,042,327 the specifications of which are hereby incorporated by reference in their entirety.

Engine compression brakes are usually manually operated and provide a variable retarding force resisting engine rotation by altering valve timing of one, two, or three banks of cylinders. This creates compressive force within the cylinders which resists rotation of the crankshaft. Exhaust brakes operate in a similar fashion by restricting exhaust flow from the engine. Exhaust brakes do not offer the responsiveness or flexibility of engine compression brakes although they are less expensive to employ.

Traditionally, engine brakes are utilized to assist the vehicle service brakes by supplying a resisting torque on the driveline when descending long grades. Manual operation of the engine brake in these situations continues to be a desirable option. More recently, engine brakes have been manually operated to decrease the time required for ratio changes. For this application, manual operation of the engine brake often results in large torque disturbances to the vehicle driveline due to inappropriate timing in applying and releasing the engine brake. This reduces drivability of the vehicle and may also adversely affect the durability of powertrain components. Furthermore, proper operation is largely dependent upon the skill and experience of the vehicle operator.

A driveline retarder may also be used alone or in combination with any of the retarding devices described above. Driveline retarders are typically pneumatically, hydraulically, or electromechanically operated to impart a retarding force on the driveline, typically the drive shaft or prop shaft of a rear-drive vehicle.

SUMMARY OF THE INVENTION

It is, therefore, an object of the present invention to provide a system and method for reducing the time required to complete a ratio change in a manual, semi-automatic or fully automatic transmission.

It is an additional object of the present invention to provide a system which reduces the time required to achieve synchronous speed by increasing a retarding force acting on engine rotation.

Another object of the present invention is to provide a system which coordinates control of an engine retarding device with a transmission and/or driveline retarding device and clutch actuator to decrease ratio changing time in a manual, semi-automatic or fully automatic transmission.

In carrying out the above object and other objects and features of the present invention, a control system is provided for reducing the ratio changing time of a mechanical transmission system. The system includes an engine selectively coupled by a master friction clutch to a mechanical change gear transmission. A master friction clutch actuator selectively engages and disengages the master friction clutch in response to a command signal. The system also includes an electronic control unit for receiving a plurality of input signals to determine an engine speed, an output shaft speed, and optionally an input shaft speed in addition to a neutral gear state of the transmission. The electronic control unit generates command signals for controlling the engine, the transmission, the clutch actuator, and associated accessory components. The transmission includes a plurality of gear ratio combinations, and a neutral gear state, selectively engageable between a transmission input shaft and a transmission output shaft. The control system may utilize a sensor for sensing the neutral gear state which occurs after disengaging a current gear ratio and before effecting a target gear ratio in the transmission. Alternatively, a neutral state may be determined based on transmission input speed and output speed. The system also includes devices for applying a retarding torque in response to a command from the electronic control unit. The retarding torque is applied by controlling at least one retarding device on the engine side of the master clutch, the transmission side of the master clutch, or both to a target speed which may be based on the synchronous speed at which the target gear ratio is effected, to enhance deceleration and reduce ratio changing time.

A method is also provided for use with the system and similar systems, including an engine coupled via a master friction clutch to a mechanical change gear transmission having a plurality of gear ratio combinations and a neutral gear state selectively engageable between a transmission input shaft and a transmission output shaft. The method includes receiving a plurality of input signals to determine current operating conditions and generating command signals to control at least one engine-side and/or transmission-side retarding devices. The method includes sensing a neutral gear state which occurs after disengaging a current gear ratio and before effecting engagement of a target gear ratio, and generating a signal to automatically actuate one or more of the retarding devices while the master friction clutch is disengaged and engine speed is above a target speed to increase engine deceleration and reduce the ratio changing time.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 1 is a schematic representation of a powertrain system including a mechanical transmission, engine-side (upstream) retarding devices, and transmission-side (downstream) retarding devices according to the present invention;

BEST MODE FOR CARRYING OUT THE INVENTION

Figure 2A:
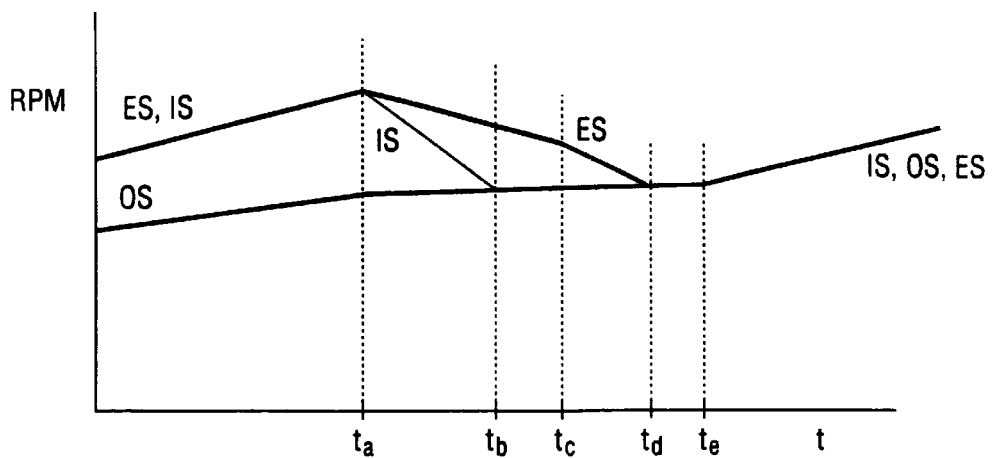
FIG. 2a is a graphical representation of a typical upshift with a master friction clutch disengaged, unassisted by a retarding device.

FIG. 1 schematically depicts a vehicular powertrain system, indicated generally by reference numeral 10. The system includes an internal combustion engine 12 which is selectively coupled to the input shaft 14 of a multiple gear change transmission 16 via a master friction clutch 18. Engine 12 may be any of a number of types of internal combustion engines, including combustion ignition and spark ignition engines. Master friction clutch 18 includes driving elements 20 which are attached to the crankshaft 22 of engine 12, and driven elements 24 which are attached to input shaft 14. As used throughout the description of this invention, the terms engine-side or upstream refer to devices or components to the left of driving elements 20 as illustrated in FIG. 1. Likewise, transmission-side or downstream devices or components are those which appear toward the right of driven elements 24 as represented in FIG. 1. When master friction clutch 18 is engaged, substantially all the torque delivered by engine 12 is transmitted through driving elements 20 and driven elements 24 to transmission 16.

Output shaft 26 of transmission 16 is adapted to engage an appropriate driveline component (not specifically illustrated), such as a differential, drive axle, transfer case, or the like. Powertrain system 10 may also include a heat exchanger 28, such as a conventional radiator, an electrically controllable cooling fan 30, and one or more engine-side retarding devices, such as engine brake 32. Other components which may selectively impart an engineside retarding force may include a hydraulic pump for power steering or other oil operated devices, an air conditioning compressor for cab climate control, an alternator for supplying electrical power, and an air compressor 34 and a compressed air storage tank 36 for powering pneumatically actuated devices or systems which may include one or more transmission-side retarding devices, such as the transmission input shaft brake 38.

Powertrain system 10 includes a number of sensors and actuators to effect control of the system as determined by the electronic control unit (ECU) 40. The various sensors provide information indicative of the current operating conditions to ECU 40 via input means 42. ECU 40 utilizes this information in executing a predetermined set of instructions, stored in a computer readable storage medium, to generate command signals. The computer readable storage medium may be implemented by any of a number of devices well known in the art including but not limited to RAM, ROM, PROM, EPROM, EEPROM, and the like. The command signals are relayed to the various actuators via output means 44.

Some representative sensors in communication with ECU 40 include a crankshaft sensor 46 for indicating engine speed (ES), an input speed sensor 48 for indicating transmission input speed (IS), and an output shaft sensor 50 for indicating transmission output speed (OS). Other sensors include a throttle position sensor 52 for indicating the position of throttle pedal 54, a brake-applied sensor 58 to indicate the state of service brake pedal 56 for applying the vehicle service brakes, and a gear selection indicator 60 for selecting a reverse (R), neutral (N), or drive (D) gear of transmission 16. In some applications, an additional gear selector is provided to indicate a request for an upshift or downshift. A manual engine brake selector 62 may be provided for allowing manual control of the engine brake under certain operating conditions, as described below.

Powertrain system 10 also includes a number of actuators in communication with ECU 40. The actuators receive commands from ECU 40 via output means 44. Preferably, a standard communications link, such as the SAE J1922 or SAE J1939, is utilized for the actuators and sensors. The actuators may also provide feedback to ECU 40 via input means 42 to effect a closed-loop control system. Typical actuators include a fuel controller 70 for regulating the amount of fuel delivered to engine 12, and a clutch actuator 72 for engaging and disengaging master friction clutch 18. Clutch actuator 72 may include a position feedback sensor to effect modulated engagement and disengagement of driving elements 20 and driven elements 24. Alternatively, clutch actuator 72 may be a simple or "dumb" actuator which is either engaged or disengaged in response to a command signal from ECU 40. Commands from ECU 40 may also be directed to actuators through other controllers. For example, fuel controller 70 may be responsible for activating engine brake 32 upon request by ECU 40. Transmission operator 74 is operative to change the gear ratio of transmission 16 to achieve a selected gear. Transmission operator 74 also provides a signal indicative of the currently engaged gear or a neutral gear state of transmission 16.

Any of a number of known sensor types may be utilized to provide information related to the current operating conditions to ECU 40 without departing from the spirit or the scope of the present invention. Similarly, known electric, hydraulic, pneumatic, and combination actuators may be implemented to realize the present invention. Transmission system controls and actuators of the type described above may be appreciated in greater detail by reference to U.S. Pat. Nos. 4,959,986; 4,576,065; and 4,445,393, the specifications of which are hereby incorporated by reference in their entirety.

Figure 2B:
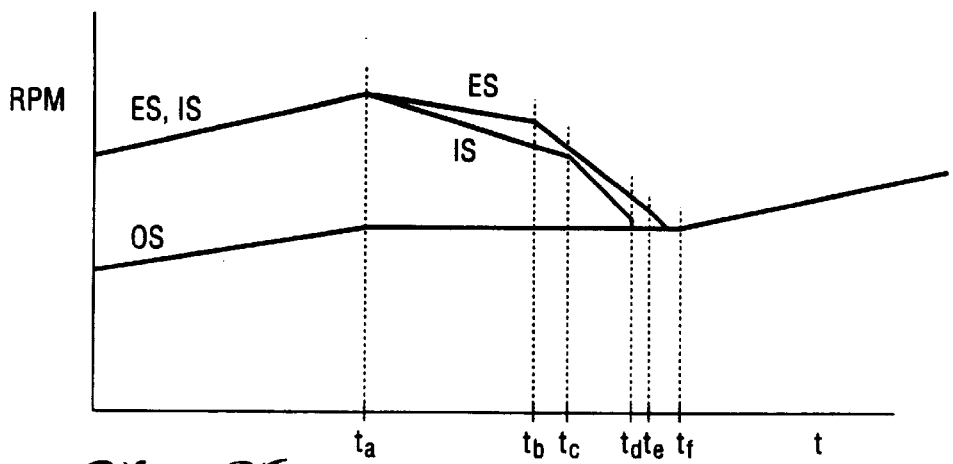
FIG. 2b is a graphical representation of an assisted upshift illustrating operation of engine-side and transmission-side retarding devices with the master friction clutch disengaged according to the present invention.
Figure 2C:
FIG. 2c is a graphical representation of an assisted upshift with illustrating operation of engine-side and transmission-side retarding devices with a master friction clutch engaged according to the present invention.

A better understanding of the operation of the present invention will be facilitated by reference to FIGS. 2a through 2c which are graphical representations of various component rotational speeds during three different upshifts.

FIG. 2a is a graphical representation of an upshift performed by powertrain system 10 of FIG. 1 with master friction clutch 18 disengaged and without utilizing a retarding force. The upshift begins at time $t_a$ where the current gear is disengaged so that transmission 16 is in a neutral gear state as indicated by transmission operator 74 or by a comparison of transmission input and output speeds. Also at time $t_a$, the engine is defuelled by fuel controller 70. Since master friction clutch 18 is disengaged, input shaft 14 is decoupled from crankshaft 22. As such, input speed (IS) and engine speed (ES) decrease at rates corresponding to their relative rotational inertias, with input speed generally decaying faster than engine speed. Input speed decreases until achieving a target speed (preferably substantially synchronous) where the transmission is shifted from neutral to the selected gear at time $t_b$. Synchronous speed is achieved when IS=OS * $GR_T$, where $GR_T$ is the target gear ratio. The clutch actuator begins engagement of the master clutch at time $t_c$ which is completed at time $t_d$ such that engine speed, input speed, and output speed are the same (illustrations assume a target gear ratio of 1.00). The upshift is complete and output speed begins to increase as fuel is restored to engine 12 by fuel controller 70 as indicated at $t_e$.

FIG. 2b is a graphical representation of an upshift with the master clutch disengaged. This figure illustrates the independent control of a transmission-side retarding device and an engine-side retarding device with the master clutch disengaged. The upshift begins at time $t_a$ where the clutch actuator disengages the master clutch. Input shaft speed and engine speed decay at different rates since their corresponding components are no longer coupled. An engine-side retarding device is applied at time $t_b$. This effectively increases the decay rate to a second decay rate. A transmission-side retarding device is applied at time $t_c$ which increases the decay rate of the input shaft of the transmission. Because control of the engine-side and transmission-side retarding devices is independent, they may be applied in virtually any order which may depend upon the particular operating conditions of the vehicle. For example, once the master clutch is disengaged, the downstream retarding device or devices could be applied prior to, simultaneously with, or subsequent to the upstream retarding device or devices. The input shaft speed approaches a target speed, preferably synchronous, where the target gear is engaged at time $t_d$. The clutch actuator engages the master clutch at time $t_e$. Fuel is restored to the engine at time $t_f$ and the upshift is complete.

FIG. 2c is a graphical representation of an upshift performed by powertrain system 10 with master friction clutch 18 engaged while also utilizing at least one automatically controlled engine-side retarding device such as engine brake 32 in combination with at least one automatically controlled transmission-side retarding device, such as inertia brake 38. At time $t_a$, the current gear is disengaged, engine 12 is defuelled, and ES begins to decrease at its natural decay rate. ECU 40 generates a command signal to apply an upstream retarding device, such as engine brake 32, when a neutral gear state is indicated at time $t_b$. The engine-side retarding device is operative to increase the decay rate of ES by a first factor or amount. A downstream or transmission-side retarding device is automatically applied to further increase the decay rate at time $t_c$ such that synchronous speed may be attained at time $t_d$. The target gear is engaged at time $t_d$ by transmission operator 74 in response to a command signal from ECU 40. Power to engine 12 is restored at time $t_e$ as fuel controller 70 increases the delivered fuel in response to a command from ECU 40, thereby completing the upshift. Of course, transmission gear disengagement and engagement could remain under control of the vehicle operator, and still be within the scope of the present invention. In the case of manual control of gear engagement, at time $t_d$ fuel controller 70 would operate to maintain ES and IS at synchronous speed until transmission operator 74 indicated that the target gear had been manually engaged.

As illustrated in FIG. 1, engine brake 32 is in communication with engine brake selector 62, which provides for manual operation of engine brake 32 when descending a long grade. Typically, the engine brake is actuated when ES is above idle and throttle pedal 54 is fully released. Engine brake selector 62 could also be arranged to allow driver selection of the level of retardation to be provided during an upshift, so that zero, one, two or three banks of cylinders are activated when signaled by ECU 40. Engine brake activation could also be limited to multiple ratio upshifts only, or only when the required engine speed decay rate for an acceptable upshift exceeds a given threshold.

As previously discussed, an engine brake may be either a compression brake or an exhaust brake. In addition to conventional engine brakes, the present invention may control various engine accessories to effect a modified form of applying an engine-side retarding force. By selectively energizing and de-energizing accessories such as cooling fan 30, air compressor 34, or other devices (not shown) such as hydraulic pumps, air conditioning compressors, or alternators, the load on engine 12 may be increased or decreased, respectively, so as to vary the engine speed decay rate. As previously stated, transmission-side retarding devices, such as input shaft brake 38 are also preferably controlled by ECU 40 and may be applied either with the master clutch engaged or disengaged to supply a retarding force operative to increase the decay rate of engine 12. As described above and illustrated in the drawings, independent control of the engine-side and transmission-side retarding devices allows them to be used alone or in any combination to produce a variable retarding force depending upon the particular system operating conditions.

Since various retarding devices, such as an engine compression brake or inertia brake, take a significant time to respond relative to the total time required for an upshift, these devices may be actuated prior to sensing a neutral gear state. The exact actuation time would depend upon the response time of the particular retarding device being utilized and the details of the strategy used to ensure that the current gear will be disengaged. This strategy works particularly well with engines which revert to idle fueling when a retarding device is activated. Reverting to idle fueling accomplishes the throttle dip function which interrupts torque transfer through the transmission to allow disengagement of the current gear.

Response time is also considered in determining when to deactivate the retarding device. The present invention deactivates the retarding device at an appropriate time to anticipate a natural engine speed decay rate when ES will be within the synchronous window, i.e. within about 40 RPM of synchronous speed.

If the target speed for IS is below a reference value such as 200 RPM above engine idle speed, alternative synchronization methods must be implemented, such as disengaging the master clutch and actuating the input shaft brake. One situation where this occurs is in completing a stationary shift since OS is zero so synchronous speed is below the engine idle reference speed.

The present invention also provides for various contingencies to accommodate diverse operating conditions. If the retarding device engages prior to its predicted engagement (due to a varying response time) in an embodiment where upshifts are normally completed with the clutch engaged, clutch operator 72 may disengage master friction clutch 18 while the current gear is being disengaged so the shift may progress acceptably. Other alternative control sequences are initiated by ECU 40 in the event that synchronization is not being accomplished. For example, application of the retarding force may be increased by using a combination of conventional engine braking with engine accessory loading and application of input shaft brake 38.

Typically, input shaft brakes are utilized to decelerate the input shaft of a transmission when the master friction clutch is disengaged. Thus, traditional input shaft brakes are designed to decelerate a limited rotational inertia. Therefore, utilizing input shaft brake 38 with the master clutch engaged according to one embodiment of the present invention may require a high-capacity input shaft brake. This allows input shaft brake 38 to accommodate the rotational inertia generated by engine 12, crankshaft 22, and master friction clutch 18 so that input shaft brake 38 may be applied while master friction clutch 18 is still engaged.

Figure 3:
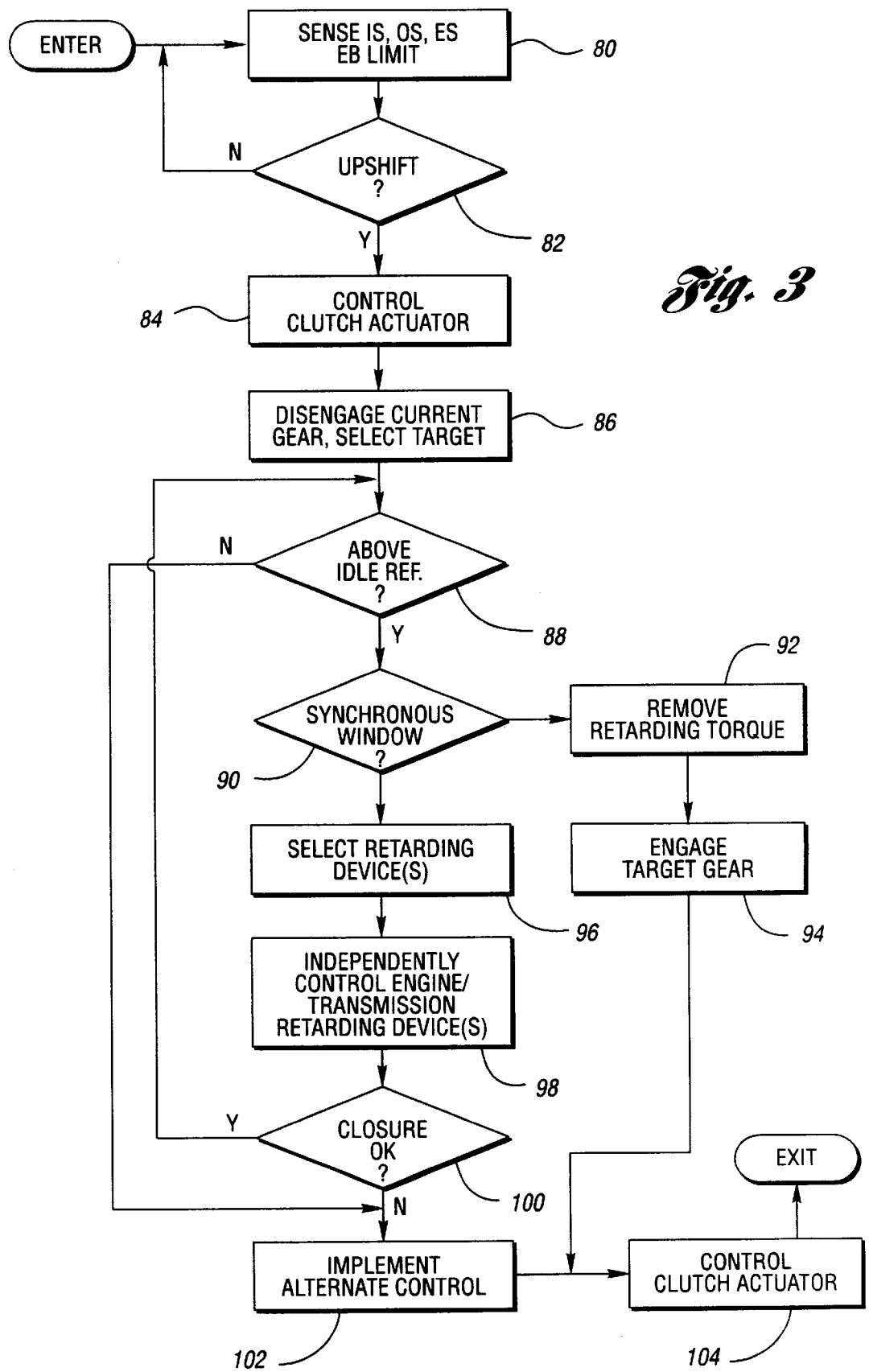
FIG. 3 is a flow chart illustrating a method of reducing ratio changing times using retarding devices according to the present invention.

FIG. 3 is a flowchart illustrating a method for decreasing ratio changing times according to the present invention. One of ordinary skill in the art will recognize that the method is illustrated in a traditional sequential flowchart for ease in description only. As such, the sequence illustrated is not necessarily required to accomplish the features and advantages of the present invention. Various steps may be performed in a different order, or simultaneously without departing from the spirit or scope of the present invention. Likewise, various steps may be performed by hardware, software, or a combination of hardware and software. At step 80, the ECU gathers information from the various sensors and actuators of the system and obtains values for ES, IS, OS, and a limiting value for engine braking. If an upshift has been requested by the operator, or is indicated by the ECU, step 82 directs processing to continue with step 84. Otherwise, the process loops back to step 80.

The clutch actuator is controlled as represented by step 84 of FIG. 3. As described above, the clutch actuator may be a "dumb actuator" which simply engages or disengages the master clutch, or a "smart" actuator which modulates the engagement and disengagement. Likewise, depending upon the particular embodiment of the invention, control of the clutch actuator as represented by block 84 may include keeping the master clutch engaged.

Block 86 represents disengagement of the current gear and selecting a target gear. Once the current gear is disengaged, the transmission is in a neutral gear state. If ES is above an idle reference value, as determined by step 88, then a test is performed to determine if engine speed is within the synchronous window as represented by block 90. Otherwise, if ES is below idle speed, alternate control strategies are initiated by step 102 which include those contingencies discussed above. If a speed within the synchronous window has not been attained, an appropriate retarding device is selected as represented by block 96. The selected engine-side retarding device and/or transmission-side retarding device is/are independently controlled as represented by block 98 to apply a retarding torque to increase the rate of decay of associated components. For example, this step may include activating an engine compression brake, activating an input shaft brake, increasing engine accessory load, or a combination of these as previously discussed.

Still referring to FIG. 3, the closure rate between ES and synchronous speed is examined at step 100. If the closure rate is satisfactory for current operating conditions, the process continues with step 88. Otherwise, alternate control strategies are implemented by step 102. Once the synchronous speed window is attained as determined by step 90, the retarding torque is removed at step 92 and the target gear is engaged at step 94 to complete the upshift.

It is understood, of course, that while the form of the invention herein shown and described constitutes a preferred embodiment of the invention, it is not intended to illustrate all possible forms thereof. It will also be understood that the words used are descriptive rather than limiting, and that various changes may be made without departing from the spirit or scope of the invention as claimed below.

What is claimed is:

1. method for reducing ratio changing time in a mechanical powertrain system including an engine selectively coupled via a master friction clutch to a mechanical change gear transmission having a plurality of gear ratio combinations and a neutral gear state selectively engageable between a transmission input shaft and a transmission output shaft, the system also including an electronic control unit for receiving a plurality of input signals to determine current operating conditions and for generating command signals, the system further including at least one retarding device upstream relative to the master friction clutch and at least one retarding device downstream relative to the master friction clutch, the retarding devices being in communication with the electronic control unit, the method comprising:

sensing a neutral gear state which occurs after disengaging a current gear ratio and before effecting engagement of a target gear ratio; and generating a signal to independently apply the at least one upstream retarding device and the at least one downstream retarding device while the engine speed is above a target speed to increase engine deceleration and reduce the ratio changing time.

2. The method of claim 1 wherein the at least one upstream retarding device includes an engine brake selectively operable by the electronic control unit, the at least one downstream retarding device includes an inertia brake, and the step of generating a signal comprises generating a signal for actuating the engine brake in combination with the inertia brake to reduce the ratio changing time.

3. The method of claim 1 wherein the plurality of input signals indicates at least a transmission input speed and a transmission output speed and wherein the step of sensing a neutral gear state comprises determining the neutral gear state based on the input speed and the output speed.

4. The method of claim 1 wherein the plurality of input signals indicates engine speed, the method further comprising:

monitoring closure rate at which the engine speed approaches the synchronous speed; and controlling application of the at least one upstream retarding device and the at least one downstream device based on the closure rate.

5. The method of claim 1 wherein the system includes a clutch actuator in communication with the electronic control unit, the method further comprising controlling the clutch actuator to disengage the master friction clutch prior to disengaging the current gear ratio.

6. The method of claim 1 wherein the step of generating a signal comprises generating a first signal to control the upstream retarding device and a second signal to control the downstream retarding device and wherein the first and second signals are generated substantially simultaneously.

7. The method of claim 1 wherein the step of generating a signal comprises generating a first signal to control the upstream retarding device and a second signal to control the downstream device and wherein the first and second signals are generated sequentially.

8. The method of claim 1 wherein the system includes a clutch actuator in communication with the electronic control unit, the method further comprising controlling the clutch actuator to maintain engagement of the master friction clutch during the ratio change.

9. The method of claim 1 wherein the target speed is substantially synchronous.

10. A system for reducing ratio changing time for a mechanical powertrain including an coupled via a master friction clutch and located on an engine-side of the master friction clutch, to a mechanical change gear transmission located on a transmission-side of the master friction clutch and having a plurality of gear ratio combinations and a neutral gear state selectively engageable between a transmission input shaft and a transmission output shaft, the system comprising:

at least one transmission-side retarding device for providing a retarding torque to at least one rotating component on the transmission-side of the master friction clutch in response to a command signal;

at least one engine-side retarding device for providing a retarding torque to at least one component on the engine-side of the master friction clutch in response to a command signal;

an actuator for selectively controlling engagement and disengagement of the master friction clutch in response to a command signal; and an electronic control unit in communication with the engine-side retarding device, the transmission-side retarding device, and the actuator, the electronic control unit receiving a plurality of input signals indicative of current operating conditions, sensing a neutral gear state, and generating command signals to independently control actuation of the at least one transmission-side retarding device and the at least one engine-side retarding device while the engine speed is above a target speed to increase engine deceleration and reduce the ratio changing time.

11. The system of claim 10 wherein the at least one engine-side retarding device comprises an engine brake in communication with the electronic control unit for providing an additional retarding torque to the engine, wherein the electronic control unit generates a signal to actuate the engine brake while the master friction clutch is engaged and the engine speed is above the target speed to reduce the ratio changing time.

12. The system of claim 10 further comprising:

a sensor in communication with the electronic control unit for generating a signal indicative of a neutral gear state occurring after disengaging a current gear ratio and before effecting engagement of the target gear ratio.

13. A computer readable storage medium having stored therein data representing instructions executable by a computer to reduce ratio changing time in a mechanical powertrain system including an engine selectively coupled via a master friction clutch to a mechanical change gear transmission having a plurality of gear ratio combinations and a neutral gear state selectively engageable between a transmission input shaft and a transmission output shaft, the system also including an electronic control unit for receiving a plurality of input signals to determine current operating conditions and for generating command signals, the system further including at least one retarding device upstream relative to the master friction clutch and at least one retarding device downstream relative to the master friction clutch, the retarding devices being in communication with the electronic control unit, the computer readable storage medium comprising:

instructions for sensing a neutral gear state which occurs after disengaging a current gear ratio and before effecting engagement of a target gear ratio; and instructions for generating a signal to independently apply the at least one upstream retarding device and the at least one downstream retarding device while the engine speed is above a target speed to increase engine deceleration and reduce the ratio changing time.

14. The computer readable storage medium of claim 13 wherein the at least one upstream retarding device includes an engine brake selectively operable by the electronic control unit and wherein the at least one downstream retarding device includes an inertia brake, the computer readable storage medium further comprising instructions for generating a signal for actuating the engine brake in combination with the inertia brake to reduce the ratio changing time.

15. The computer readable storage medium of claim 13 wherein the plurality of input signals indicates at least a transmission input speed and a transmission output speed, the computer readable storage medium further comprising instructions for determining the neutral gear state based on the input speed and the output speed.

16. The computer readable storage medium of claim 13 further comprising:

instructions for monitoring closure rate at which the engine speed approaches the synchronous speed; and instructions for controlling application of the at least one upstream retarding device and the at least one downstream device based on the closure rate.

17. The computer readable storage medium of claim 13 further comprising instructions for controlling a clutch actuator to disengage the master friction clutch prior to disengaging the current gear ratio.

18. The computer readable storage medium of claim 13 wherein the instructions for generating a signal comprise instructions for generating a first signal to control the upstream retarding device and instructions for simultaneously generating a second signal to control the downstream retarding device.

19. The computer readable storage medium of claim 13 wherein the instructions for generating a signal comprise instructions for generating a first signal to control the upstream retarding device and instructions for sequentially generating a second signal to control the downstream retarding device.

* * * * *

UNITED STATES PATENT AND TRADEMARK OFFICE
CERTIFICATE OF CORRECTION

PATENT NO. : 6,223,592 B1
DATED : May 1, 2001
INVENTOR(S) : Thomas A. Genise

It is certified that error appears in the above-identified patent and that said Letters Patent is hereby corrected as shown below:

<u>Column 10,</u>
Line 22, claim 10, after "an" and before "coupled" insert -- engine --.

Signed and Sealed this

Twenty-eighth Day of August, 2001

*Attest:*

*Nicholas P. Godici*

*Attesting Officer*

NICHOLAS P. GODICI
*Acting Director of the United States Patent and Trademark Office*